April 28, 1925.　　　　　J. A. NEELY ET AL　　　　　1,535,679
PNEUMATIC HORSE COLLAR
Filed July 17, 1924
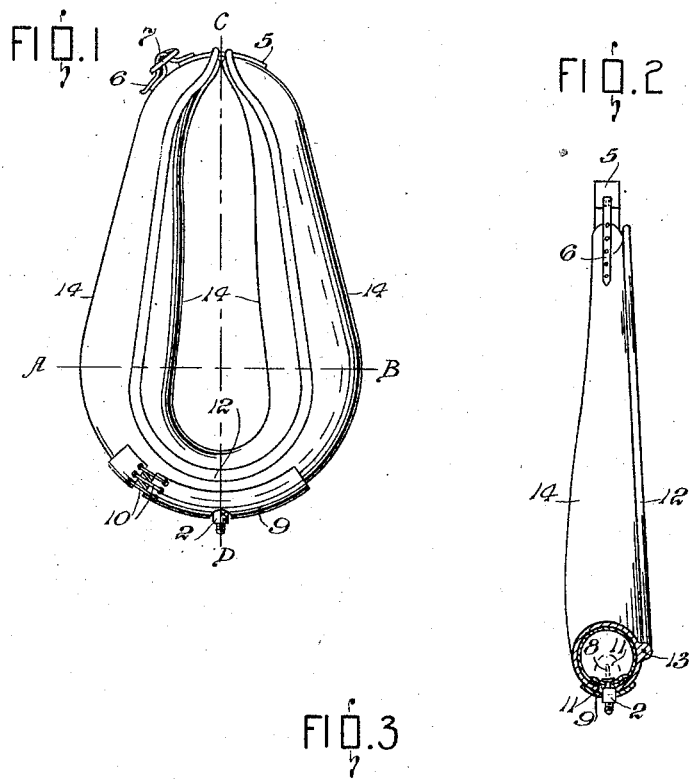
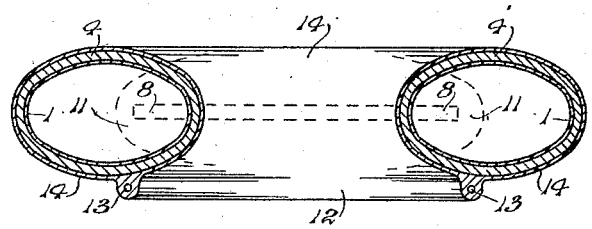
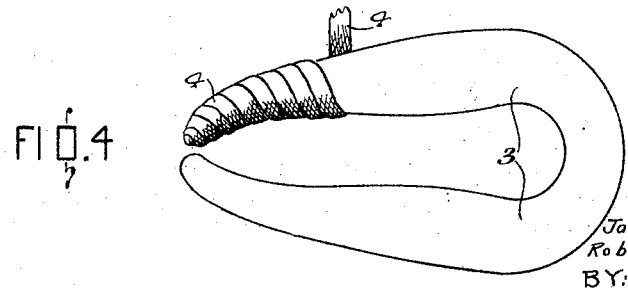
INVENTORS:
James Andrew Neely
Robert Percival Henry
BY: Francis E. Boyce
ATTORNEY Patented Apr. 28, 1925.

1,535,679

UNITED STATES PATENT OFFICE.

JAMES ANDREW NEELY, OF WAIMATE TOWNSHIP, CANTERBURY, AND ROBERT PERCIVAL HENRY, OF GLENAVY, NEAR WAIMATE, NEW ZEALAND.

PNEUMATIC HORSE COLLAR.

Application filed July 17, 1924. Serial No. 726,588.

*To all whom it may concern:*

Be it known that JAMES ANDREW NEELY, a subject of the King of Great Britain, and resident of "The Agencies," Queen Street, in the township of Waimate, in the Province of Canterbury, in the Dominion of New Zealand, and ROBERT PERCIVAL HENRY, a subject of the King of Great Britain, and resident of "Tawai," Glenavy, near Waimate, aforesaid, have invented new and useful Improvements in Pneumatic Horse Collars, of which the following is a specification.

This invention relates to a horse-collar and refers to that particular type in which the necessary resiliency is provided by means of a pneumatic cushion.

It is the object of the present invention chiefly to provide a collar of this nature in which the pneumatic cushion will be contained in a casing so constructed as to be capable of a sufficient degree of elasticity to permit of such casing adjusting itself to bear evenly upon the neck of the horse. That is to say the construction is such that local pressures upon the air-cushion, such for example as those occasioned by the hames-hooks, will, instead of acting locally upon the neck, be distributed throughout the collar thus preventing the formation of sores, while a further object of the invention is to provide a construction in which the neck-contacting surface of the collar will be composed entirely of rubber without lining or padding of any kind thereby avoiding the heating and chafing of the neck which occurs in cases where felt and other lining material is used.

In order that the nature of the invention and its construction may be clearly understood, it will now be explained with reference to the accompanying sheet of drawings, in which:—

Fig. 1.—is a front view of a collar constructed in accordance with the present invention, Fig. 2.—is a longitudinal section of the same along the line C—D Fig. 1, Fig. 3.—is a cross-section along the line A—B Fig. 1, such section being drawn to a somewhat larger scale than the two preceding figures, and, Fig. 4.—shows a mould upon which the casing is formed and illustrates the method of construction employed in building up such casing.

In carrying the invention into effect, the pneumatic cushion 1 employed consists of a length of rubber tubing similar to the inflatable tube of a pneumatic tire, such tube being suitably fashioned and closed at its ends, while at an intermediate point upon its length, such tube is provided with a valve 2 similar to that of a tire-valve in order that the tube may be inflated by means of a pump in the customary manner.

According to the present invention the casing, within which the said pneumatic cushion is contained, is formed, as illustrated in Fig. 4, by winding upon a suitable mould as 3, strips of rubberized canvas 4 so cut that the threads will run on the bias, such strips being wound layer upon layer to provide the desired wall thickness.

If thought necessary or desirable in order to facilitate its removal from the casing on completion of the latter, the said mould 3 will be composed of a number of sections capable of being withdrawn individually.

The said casing is, as customary with horse-collars in use at the present time, made continuous at the sides and portion which passes beneath the neck, such sides terminating in two separate ends above the neck and at which point such ends are secured together by the customary flap 5 adapted to be passed over such ends and to be fastened by appropriate means such as a strap 6 and buckle 7 or by lacing.

In the bottom of the casing beneath the neck there is formed a suitable slit or opening 8 through which the mould 3 is withdrawn and the said pneumatic tube inserted. The said slit or opening is covered by a strong flap 9 adapted to be secured in place by lacing 10 or by straps and buckles so as to securely confine the pneumatic cushion and maintain the casing in shape.

Inserted within the collar casing so as to lie between the bottom of the pneumatic tube 1 and the portion of such casing in which the slit 8 occurs is a sleeve or flap 11 composed of rubber and canvas and having a central opening through which the valve 2 protrudes. The said sleeve 11 is made of somewhat greater length than the slit in order that it may completely cover such slit and strengthen the casing at this point to withstand the pressure of the pneumatic cushion.

Around the external surface of the front of the casing is formed a rib 12 of hard rubber and canvas reinforced with a steel wire core 13, such rib being arranged to receive the hames in the usual manner.

The casing so constructed is coated externally with a layer 14 of rubber, the whole being built up in a raw state and then cured in the customary manner.

If thought necessary or desirable in place of the single pneumatic cushion two or more pneumatic cushions may be employed in the casing.

A collar-casing constructed in accordance with the foregoing description while of sufficient strength to retain its general shape will be flexible enough to permit of its accommodating itself to fit truly and evenly upon the neck, while local pressures such as those which occur at which the hames-hooks bear, will be distributed in the form of slightly increased pressure over the whole of the neck-contacting portion of the collar. Again on account of the fact that the neck-contacting surface is of rubber there will be no tendency for the collar to cause heating chafing of the skin as in cases where felt and other like covering material is employed.

We claim:—

1. A pneumatic horse-collar comprising in combination with an inflatable tube, of a collar-casing to contain said tube and composed of strips of rubberized canvas wound in successive layers upon a mould and coated externally with a layer of rubber.

2. A pneumatic horse-collar as defined in claim 1 characterized in that the rubberized canvas strips of which the casing is composed are cut with the threads running on the bias.

3. A pneumatic horse-collar as defined in claim 1 characterized in that the collar-casing is formed with a rib of hard rubber and canvas extending around the front external surface thereof to receive the hames.

4. A pneumatic horse-collar, comprising in combination, an inflatable tube, a collar-casing adapted to contain said tube, said casing being composed of strips of rubberized canvas wound in successive layers and coated externally with a layer or rubber, and a rib of hard rubber and canvas formed integral with said casing and extending around the front external surface thereof.

5. A pneumatic horse-collar as defined in claim 4, having a reinforcing steel wire core extending through said rib.

In testimony whereof we have signed our names to this specification.

JAMES ANDREW NEELY.
ROBERT PERCIVAL HENRY.

In the presence of—
HENRY CARTER,
ROBERT MATHEW DEMPSEY.